United States Patent
Heen

[11] 3,798,787
[45] Mar. 26, 1974

[54] METHODS AND APPARATUS FOR RECOVERY OF VOLATILE SOLVENTS

[75] Inventor: Helge K. Heen, Jamestown, N.Y.

[73] Assignee: Blackstone Corporation, Jamestown, N.Y.

[22] Filed: June 7, 1971

[21] Appl. No.: 150,452

[52] U.S. Cl. .............................. 34/75, 34/77, 34/242
[51] Int. Cl. ............................................. F26b 21/06
[58] Field of Search ............... 34/72, 75, 76, 77, 78, 34/242, 22, 80, 92; 117/63, 102

[56] References Cited
UNITED STATES PATENTS

| | | | |
|---|---|---|---|
| 2,361,350 | 10/1944 | Keep et al. | 117/102 A |
| 3,183,605 | 5/1965 | Argue et al. | 34/72 |
| 3,421,229 | 1/1969 | Kniese | 34/92 |
| 2,633,928 | 4/1953 | Chamberlain | 34/80 |
| 3,112,188 | 11/1963 | Zehnder | 34/77 |
| 3,087,254 | 4/1963 | Kubodera | 34/77 |
| 2,060,389 | 11/1936 | Wigelsworth | 34/77 |
| 3,466,757 | 9/1969 | Dunn | 34/75 |

Primary Examiner—Kenneth W. Sprague
Assistant Examiner—James C. Yeung
Attorney, Agent, or Firm—Buell, Blenko & Ziesenheim

[57] ABSTRACT

An apparatus is provided for recovering organic solvent vapor which includes an article treating chamber in which the organic solvent is applied, a vapor chamber into which the article passes for drying, a refrigerated fall out chamber receiving gases from the vapor chamber to remove vapor by condensation and returning the gases to the vapor chamber and means circulating the gases used as a carrier.

7 Claims, 7 Drawing Figures

PATENTED MAR 26 1974

INVENTOR
Helge K. Heen

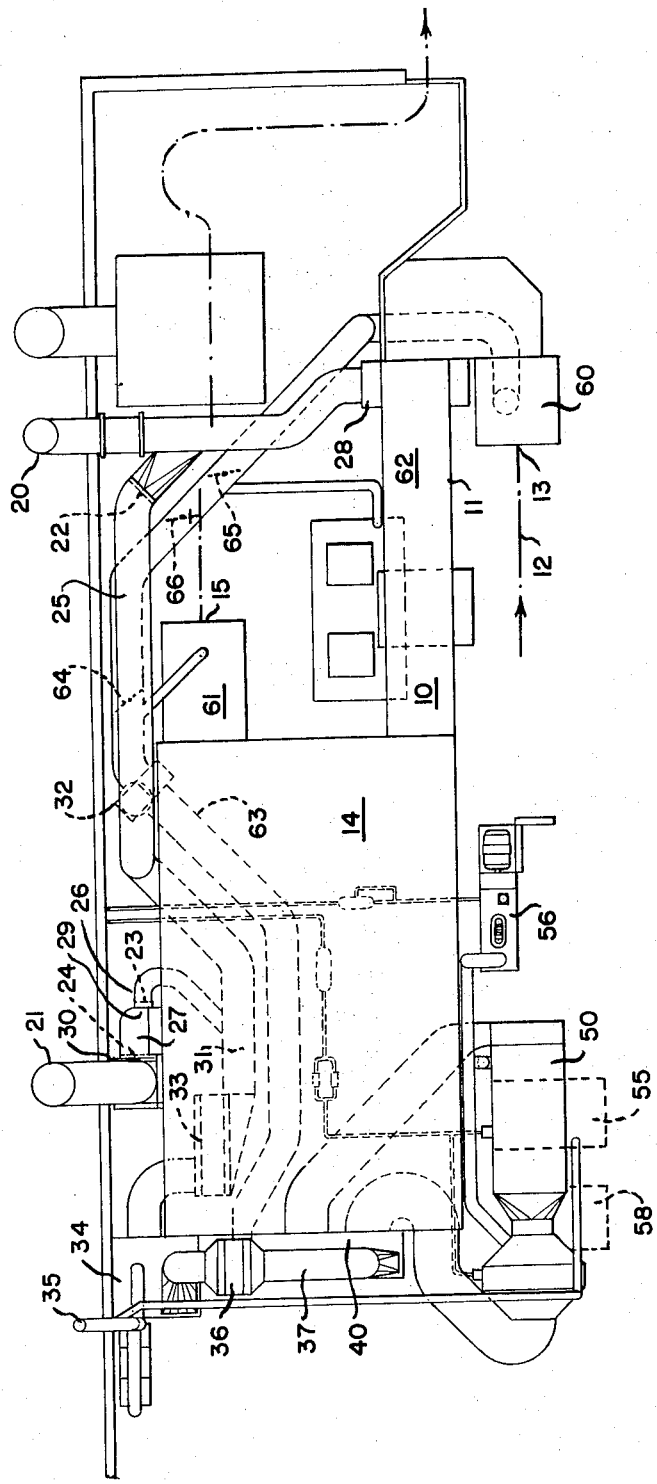

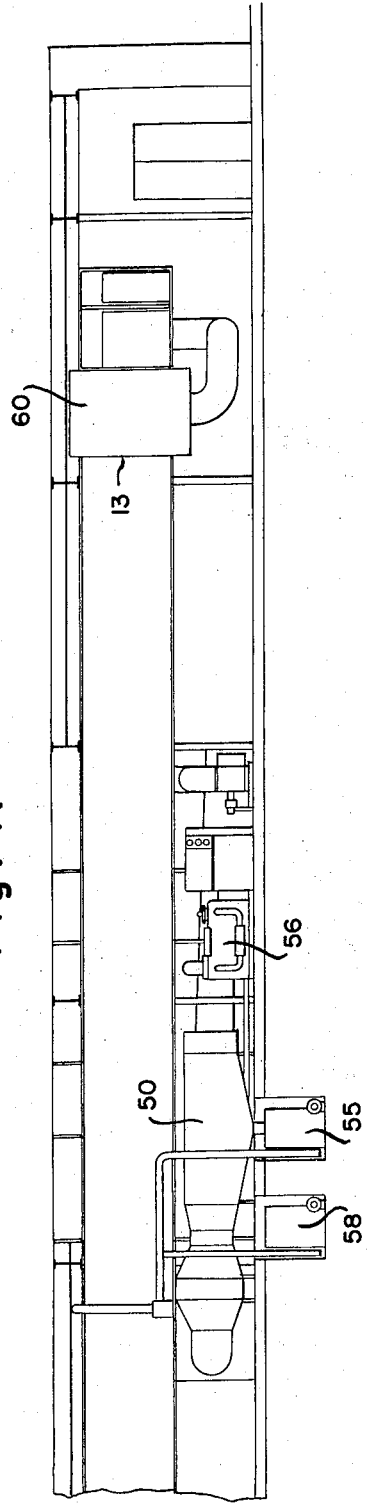
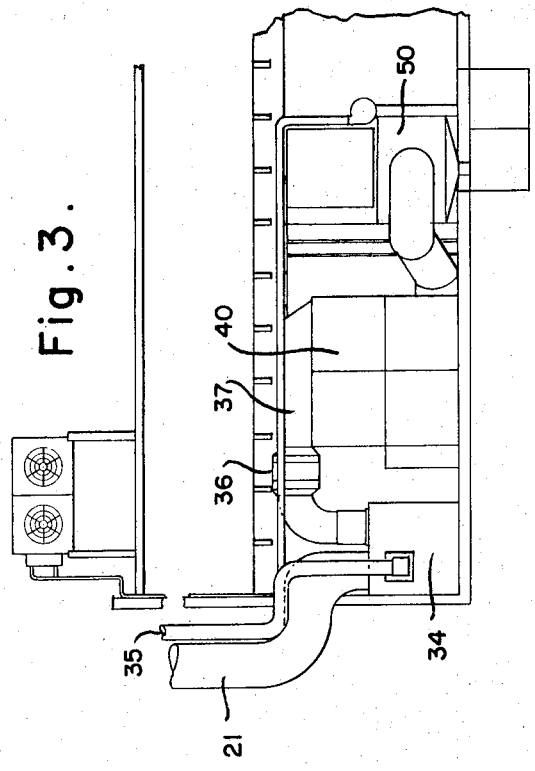

METHODS AND APPARATUS FOR RECOVERY OF VOLATILE SOLVENTS

This invention relates to methods and apparatus for recovery of volatile solvents and particularly to a method of recovering solvents such as naptha from paint spraying operations and other like industrial operations.

The problems of recovering organic solvents and other possible air pollutants are of foremost importance to many industrial operations. Organic solvents pose a particularly difficult problem because of their low boiling point and their general propensity to form highly explosive mixtures with air as they become concentrated. In general the practice in the past has been to exhaust organic solvent vapors from industrial processes into the atmosphere with large amounts of diluent or carrier air so that they never reached the stage of forming an explosive mixture. Methods of satisfactorily recovering these solvent vapors have not been generally available because of (1) the poor economics of attempting to recover the vapor from a dilute gaseous phase and (2) the danger of attempting to concentrate such vapors and then recovering them.

Such methods and apparatus as have been proposed in the past have been uneconomical or so limited in their scope as to be practically unusable for general solvent recovery. For example it has been proposed to adsorb the solvent from an air-solvent mixture on an activated carbon bed and then recover the solvent from the carbon bed by steam distillation (Barnebey U.S. Pat. No. 1,811,107). It has also been proposed to fill a system containing solvent vapor with steam to exclude air and then recover both the steam and solvent by condensation and separate the two by decantation (Hopewell U.S. Pat. No. 1,063,686). Neither of these systems is practical for many solvent vapors. Actuated charcoal systems are in use for some solvents but they are not used for recovery of naptha and many other solvents for which they are not effective.

I have developed a method and apparatus for recovering organic solvent vapors which solves these problems. In my method I recirculate a dry carrier or diluent gas which is a gas at ordinary temperatures and pressures and maintain the ratio of carrier gas to solvent at a level as low as practical to reduce the amount of carrier gas in the system. The mixture of solvent vapor and gas is cooled to a point below the dew point of the solvent so that it liquifies and drops to the bottom of the cooling chamber where it is collected and reused. The dry carrier or diluent gas should be an inert or non-reactive gas such as nitrogen. Such an inert gas has very practical advantages. When the oxygen in the recirculated gas has been reduced below a certain unit (this varies depending on the type of added inert gas) then combustion cannot be maintained in the gas solvent mixture. This allows operating the equipment at a higher solvent concentration or a much lower rate of recirculated gas flow. Reduced gas flow means smaller recovery equipment and lower fuel power and refrigeration costs. These costs are reduced by almost directly proportional to the gas rate reduction. A factor of 0.8 is often used for capital cost as a function of the size of the equipment. This would then give a formula of:

Capital cost for flow $A =$
$= $ (Capital cost for flow B) $\times$ (A/B) 0.8

Preferably I provide an article treatment chamber, an inlet air lock into said treatment chamber, a vapor chamber connected to said article treatment chamber receiving the treated article, an air lock exit on said vapor chamber, a refrigerated fall out chamber adjacent the vapor chamber continuously receiving the atmosphere from said vapor chamber and removing liquified solvent therefrom, means circulating the atmosphere in said article treating chamber, vapor chamber and fall out chamber and means for maintaining a substantially dry non-reactive atmosphere in said chambers. Preferably the entry air lock and the exit air lock are moving baffles synchronized with a movable conveyor for handling articles into and out of the article treatment chamber and vapor chamber. The refrigerated fall out chamber is preferably an elongated generally cylindrical housing containing baffles carrying refrigerant which rapidly cools the gas brought into the unit and liquifies the solvents therein. Preferably I maintain a non-reactive atmosphere by controlling the ratio of air to vapor or by adding an inert or non-reactive gas such as nitrogen.

In the foregoing general statement of my invention I have set out certain objects, purposes and advantages of my invention. Other objects, purposes and advantages of this invention will be apparent from a consideration of the following description and the accompanying drawings in which:

FIG. 2 is a top plan view of a solvent recovery system according to my invention in conjunction with a paint spray operation;

FIG. 3 is a side elevation of the apparatus of FIG. 2;

FIG. 4 is a front elevation of the apparatus of FIG. 2;

Figure 1:
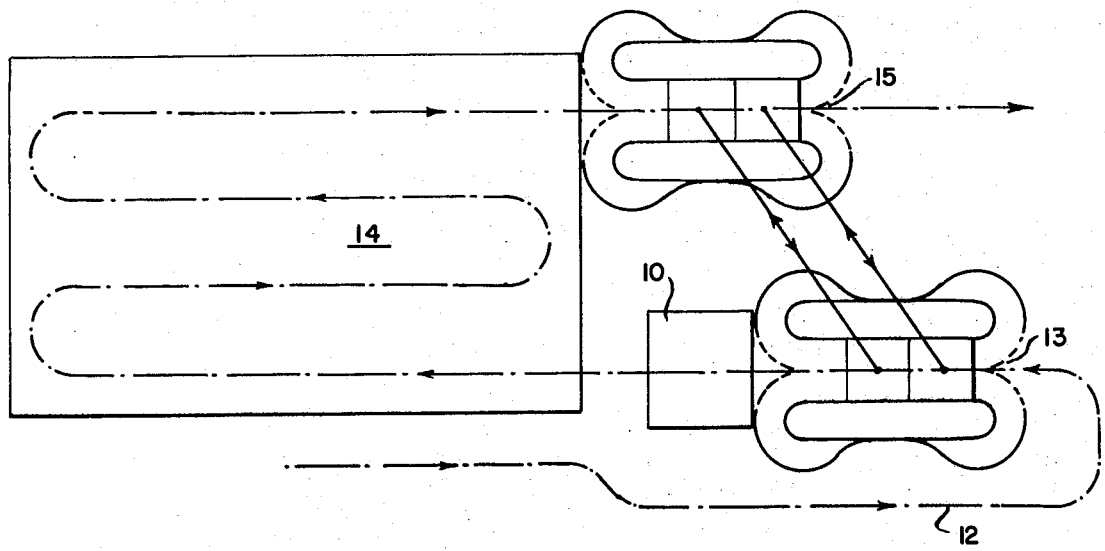
FIG. 1 is a schematic illustration of a solvent recovery system according to my invention.
Figure 6:
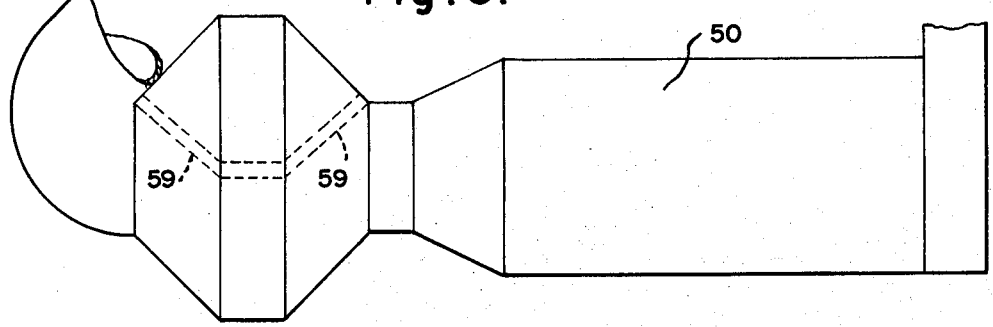
FIG. 6 is a plan view of the fall out chamber of FIG. 5.
Figure 5:
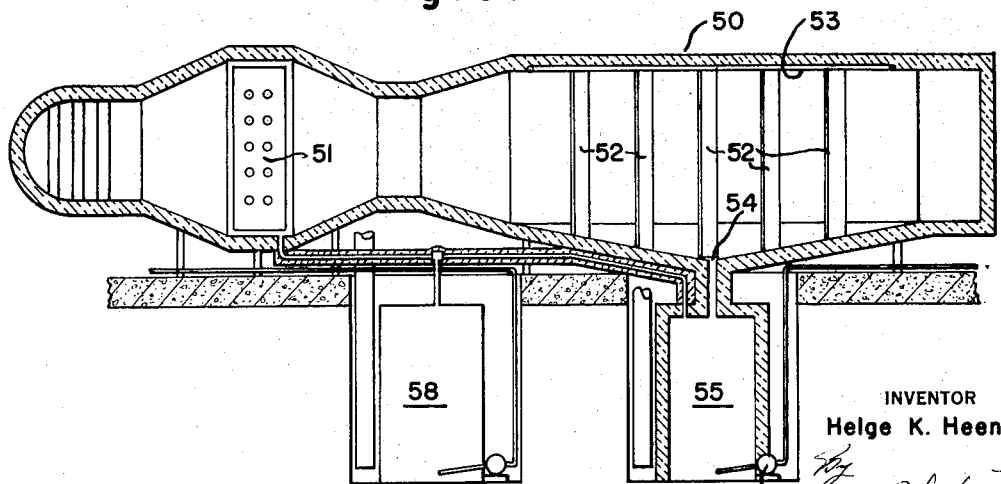
FIG. 5 is a section through a fall out chamber as used in the system of FIG. 2.
Figure 7:
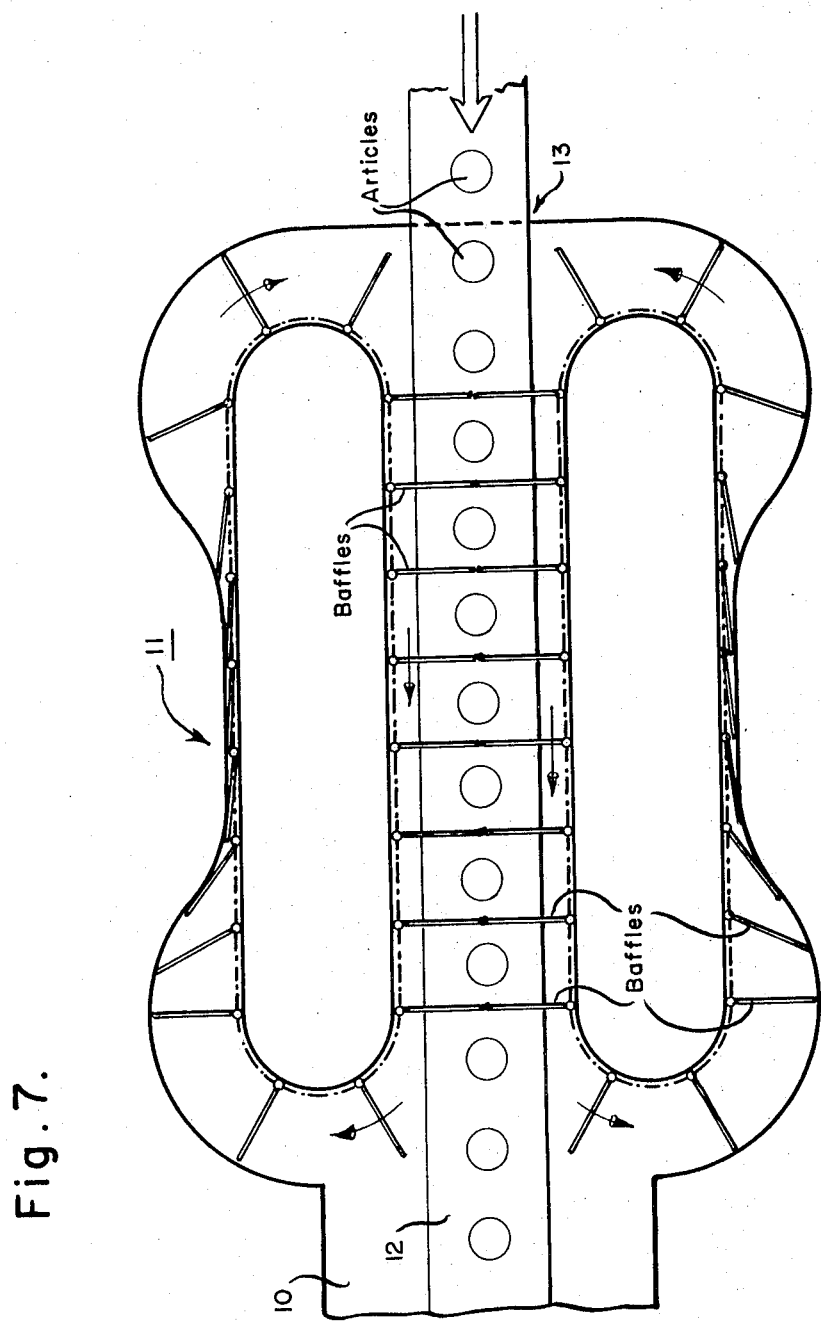
FIG. 7 is a plan view of a manifold as used in this invention.

Referring to the drawings I have illustrated an apparatus for solvent recovery from a spray painting and drying operation having a paint application area 10 within an elongated housing 11. An object to be painted is carried by a conveyor 12 through entry manifold 13 into housing 11 and paint application area 10. The manifold 13 may be in the form of a plurality of spaced baffles movable in the line of travel so as to form an air lock around the articles being introduced into the application area 10. The conveyor then carries the article from the paint application area 10 into the vapor chamber 14 where it follows a sinuous path, during which time the solvent in the paint is evaporated into the vapor chamber 14 where it is picked up by the carrier gas (in this case air). 6 the article is dry it passes from the vapor chamber through manifold 15 of the same type as manifold 13.

Two emergency exhaust stacks 20 and 21 are provided connected to the circulation system for the system. Adjustable dampers 22, 23 and 24 are provided in ducts 25, 26 and 27 which lead from inlets 28, 29 and 30 respectively to control the air flow through these ducts. The air from these three ducts are combined in one duct 31 and is moved by primary fan 32 into the air filter 33, then to the dehumidifier 34. The dehumidifier 34 is preferably of the well-known solid desiccant non-cycling sorption type having a single rotary desiccant bed capable of continuous operation. A reactivation air exhaust stack 35 is provided at the dehumidifier to remove the air used in reactivation of the desiccant bed.

The gases from the dehumidifier 34 are carried through cooling coils 36 in duct 37 to heat exchanger 40. The gases having been thus cooled are carried to fall out chamber 50 where they pass through cooling coils 51 and through perforate plates 52 surrounded by cooling coils 53. The solvent vapors are condensed and fall to the bottom of chamber 50 from which they are delivered by line 54 to solvent sump tank 55. The cooling coils 51 and 53 are supplied with refrigerant from compressor 56. The condensed solvent is pumped from tank 55 by pump 57. Any water condensed in the fall out chamber is collected in water tank sump 58.

The cooled air from fall out chamber 50 is returned to the heat exchanger 40 where it absorbs heat from the gases passing therethrough on their way to the fall out chamber. From the heat exchanger the dry gases go to the return hoods 60, 61 and 62 through duct 63. Adjustable air dividers 64, 65 and 66 are provided in the duct 63 to regulate the return air flow to match the air entering at inlets 28, 29 and 30. This provides a recirculation of dryed air in the system which in turn reduces the moisture recovery problem within the system and thus the dehumidification load.

In order that the maximum efficiency of cooling being obtained in the fall out chamber cooling coil selective baffles 59 are provided at the cooling coil 51 so that only one half of the cooling coil is in use at any time and the other half is being deiced. Preferably the baffles 59 are switched automatically by a differential flow sensor of any well known type (not shown) which determines when the pressure drop across the cooling coils has increased to a point of showing excessive icing, at which point the baffles are shifted.

In the foregoing specification I have illustrated a presently preferred embodiment and practice of my invention. It will be understood, however, that this invention may be otherwise embodied within the scope of the following claims.

I claim:

1. An apparatus for recovering a normally explosive organic solvent vapor comprising an article treating chamber in which organic solvent is applied, an inlet air lock entry means into said treatment through which articles to be treated are introduced, a vapor chamber connected to said article treatment chamber receiving the treated article from the article treatment chamber for dwell therein until substantially all of the vaporizable solvent is removed, an air lock exit means on said vapor chamber through which treated articles are delivered, a refrigerated fall out chamber adjacent the vapor chamber continuously receiving gases from the vapor chamber and removing liquified solvent therefrom by condensation, means circulating the gases from the fall out chamber to the article treating chamber and vapor chamber through the entry and exit air locks and means for maintaining a substantially dry non-reactive atmosphere in said chambers.

2. An apparatus as claimed in claim 1 wherein each of the exit and entry air locks is a plurality of moving baffles defining a plurality of small moving chambers in which the articles for treatment are carried into and out of the system.

3. An apparatus as claimed in claim 1 wherein the means maintaining a substantially dry non-reactive atmosphere includes a dehumidifier and filter over which the gases pass prior to reaching the fall out chamber.

4. An apparatus as claimed in claim 1 including a heat exchanger adjacent the fall out chamber receiving in heat exchange relationship gases going to and coming from the fall out chamber whereby the gases going to the fall out chamber are cooled by the gases coming from said fall out chamber.

5. An apparatus as claimed in claim 1 wherein the means maintaining a substantially dry non-reactive atmosphere includes a source of non-reactive gas from the group consisting of inert gases and nitrogen.

6. An apparatus as claimed in claim 1 wherein emergency stack means are provided with connections to the treatment and vapor chambers.

7. A method of recovering a normally explosive organic solvent vapor from the treatment of articles with a solvent containing system comprising the steps of:
  a. introducing the articles to be treated through air lock means into a treatment chamber and an adjacent connected vapor chamber within a housing,
  b. maintaining a constant recirculating flow of carrier gas through said housing,
  c. passing the recirculating carrier gas successively through a filter, heat exchanger and refrigerated chamber whereby solvent vapor is condensed from the carrier gas, and
  d. collecting the condensed solvent for reuse.

* * * * *